United States Patent
Chen et al.

(10) Patent No.: US 8,134,353 B2
(45) Date of Patent: Mar. 13, 2012

(54) MULTI-PHASE POWER CONVERTER AND CONTROL CIRCUIT AND METHOD THEREOF

(75) Inventors: Ching-Jan Chen, Taipei (TW); Chun-Shih Huang, Kaohsiung (TW); Kuo-Lung Tseng, Chupei (TW); Dan Chen, Taipei (TW)

(73) Assignee: Richtek Technology Corporation, R.O.C. (TW)

( * ) Notice: Subject to any disclaimer, the term of this patent is extended or adjusted under 35 U.S.C. 154(b) by 392 days.

(21) Appl. No.: 12/459,507

(22) Filed: Jul. 2, 2009

(65) Prior Publication Data
US 2010/0225288 A1 Sep. 9, 2010

(30) Foreign Application Priority Data
Mar. 5, 2009 (TW) ................................ 98107194 A

(51) Int. Cl.
*G05F 1/565* (2006.01)

(52) U.S. Cl. ........................................ 323/275; 323/241

(58) Field of Classification Search .......... 323/280–290, 323/272–275, 224, 247, 241; 363/16–17, 363/65, 98, 41, 81, 89
See application file for complete search history.

(56) References Cited

U.S. PATENT DOCUMENTS

| 5,982,160 | A  | * | 11/1999 | Walters et al. | 323/282 |
| 6,674,774 | B1 | * | 1/2004  | Van Laanen    | 372/38.02 |
| 7,342,383 | B1 | * | 3/2008  | Song et al.   | 323/222 |
| 7,492,134 | B2 | * | 2/2009  | Tang et al.   | 323/241 |
| 7,570,036 | B2 | * | 8/2009  | Tang et al.   | 323/283 |
| 7,863,875 | B1 | * | 1/2011  | Guo et al.    | 323/275 |
| 7,889,525 | B2 | * | 2/2011  | Moussaoui     | 363/65 |
| RE42,307  | E  | * | 4/2011  | Walters et al.| 323/277 |

* cited by examiner

*Primary Examiner* — Rajnikant Patel
(74) *Attorney, Agent, or Firm* — Tung & Associates

(57) ABSTRACT

The present invention discloses a multi-phase power converter, and a control circuit and a control method of the multi-phase power converter. The multi-phase power converter comprises multiple power conversion phases. The method comprises: determining whether to enter a phase-shedding mode; at a first time when entering the phase-shedding mode, disabling at least one of the power conversion phases; and at another time when entering the phase-shedding mode, disabling at least another one of the power conversion phases.

14 Claims, 4 Drawing Sheets

MULTI-PHASE POWER CONVERTER AND CONTROL CIRCUIT AND METHOD THEREOF

FIELD OF INVENTION

The present invention relates to a multi-phase power converter and a control circuit and a control method thereof; particularly, it relates to a multi-phase power converter capable of balancing the loadings of different phases in a phase-shedding mode, and a control circuit and method thereof.

DESCRIPTION OF RELATED ART

A multi-phase power converter includes multiple switching regulators operating according to different switching timings to provide power to a common output terminal. Because there are multiple power supply channels operating according to different switching timings, the converter is thus called a "multi-channel" or "multi-phase" power converter. FIG. 1 shows an example of a prior art multi-phase boost converter. The multi-phase boost converter 1 includes multiple power conversion phases P1-Pn; the operation timings of power switches S1-Sn in respective power conversion phases are different so as to share the loading, and to reduce the ripple in the output current. FIG. 2 shows an example of a prior art multi-phase buck converter, including two power conversion phases. The first set of power switches S1U and S1L control the power conversion by the first power conversion phase, and the second set of power switches S2U and S2L control the power conversion by the second power conversion phase. Although the two sets of power switches are controlled by the same power management chip 10, the operation timings thereof are different.

When a load circuit coupled to the output terminal is in a light loading status, the multi-phase power converter can disable some of the phases to reduce switching loss, which is referred to as "phase shedding". The phase shedding mode for example can be controlled by an external signal. Referring to FIG. 2, the power management chip 10 can disable one of the power conversion phases to suspend its operation according to an external control signal PSC.

When it is required to enter the phase-shedding mode in the prior art, the disabled power conversion phase or phases are always the same. For example, the two-phase buck converter as shown in FIG. 2 always disables the second phase in the phase-shedding mode as shown in table 1 below.

TABLE 1

|  | Single phase mode | Full phase mode |
| --- | --- | --- |
| Operational phase | P1 | P1, P2 |
| Disabled phase | P2 |  |

In other words, when the prior art enters the phase-shedding mode, the disabled power conversion phase or phases never change. The drawback of such arrangement is that the work loads of the power switches and the inductors in different phases are not balanced; the power conversion phases more often used are damaged earlier than other power conversion phases. As a result, the life time of the entire circuitry is adversely affected.

In view of the foregoing problem of the prior art, the present invention provides a multi-phase power converter capable of balancing the loadings of different phases in phase-shedding mode, and a control circuit and method thereof.

SUMMARY OF THE INVENTION

An objective of the present invention is to provide a multi-phase power converter.

Another objective of the present invention is to provide a method of controlling the multi-phase power converter.

Yet another objective of the present invention is to provide a control circuit of the multi-phase power converter.

To achieve the foregoing objectives, in one perspective, the present invention provides a multi-phase power converter comprising: multiple power conversion phases; and a control circuit determining whether one or more of the multiple power conversion phases are in operation, wherein the control circuit does not always disable the same power conversion phase when the multi-phase power converter enters a phase-shedding mode.

In another perspective, the present invention provides a method of controlling a multi-phase power converter, the multi-phase power converter including multiple power conversion phases, the method comprising: determining whether to enter a phase-shedding mode; at a first time when entering the phase-shedding mode, disabling at least one of the power conversion phases; and at another time when entering the phase-shedding mode, disabling at least another one of the multiple power conversion phases.

When the multi-phase power converter has three or more than three phases, the above mentioned method preferably further includes the following steps: setting a disabling flag or index pointing to one of the power conversion phases; and when entering the phase-shedding mode, disabling one or more of the power conversion phases starting from the phase where the disabling flag or index points to, and setting the disabling flag or index to point to one of the power conversion phases which are not disabled.

When the multi-phase power converter has three or more than three phases, the above mentioned method preferably further includes the following steps: setting a recovering flag or index pointing to one of the disabled power conversion phases; and recovering one or more of the power conversion phases starting from the disabled phase where the recovering flag or index points to, and setting the recovering flag or index to point to one of the power conversion phases which are still disabled.

In yet another perspective, the present invention provides a control circuit of a multi-phase power converter, the multi-phase power converter including multiple power conversion phases, the control circuit comprising: a gate driver control circuit generating driver signals for driving the multiple power conversion phases to perform a power conversion operation, respectively; and a phase selection circuit coupled to the gate driver control circuit, the phase selection circuit determining whether to enter a phase-shedding mode according to a phase control signal; at a first time when entering the phase-shedding mode, the gate driver control circuit disabling at least one of the multiple power conversion phases; and at another time when entering the phase-shedding mode, the gate driver control circuit disabling at least another one of the multiple power conversion phases.

The objectives, technical details, features, and effects of the present invention will be better understood with regard to the detailed description of the embodiments below, with reference to the drawings.

DESCRIPTION OF THE PREFERRED EMBODIMENTS

Figure 1:
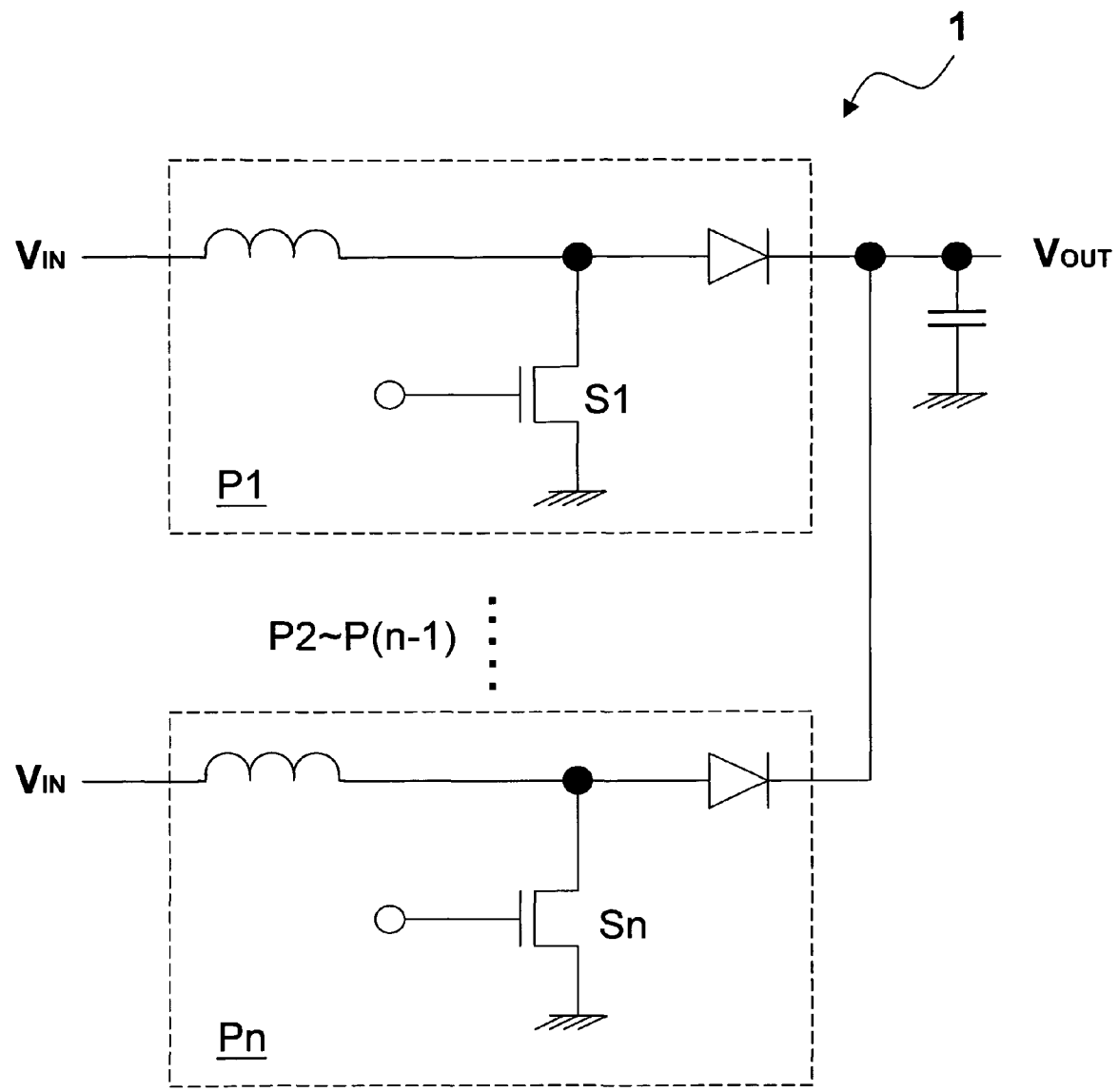
FIG. 1 is a schematic circuit diagram of a prior art multi-phase boost converter.
Figure 2:
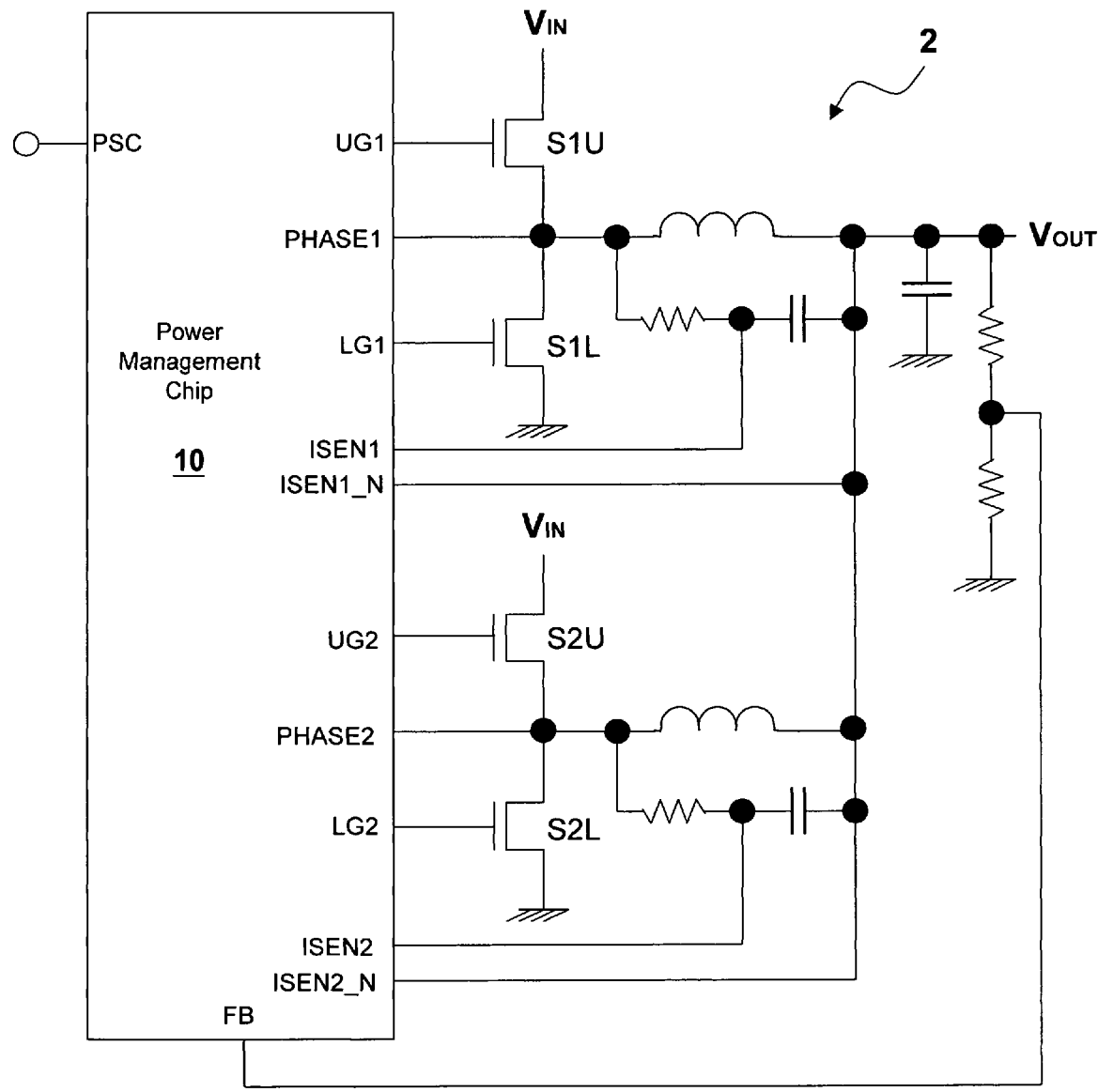
FIG. 2 is a schematic circuit diagram of a prior art two phase buck converter.
Figure 3:
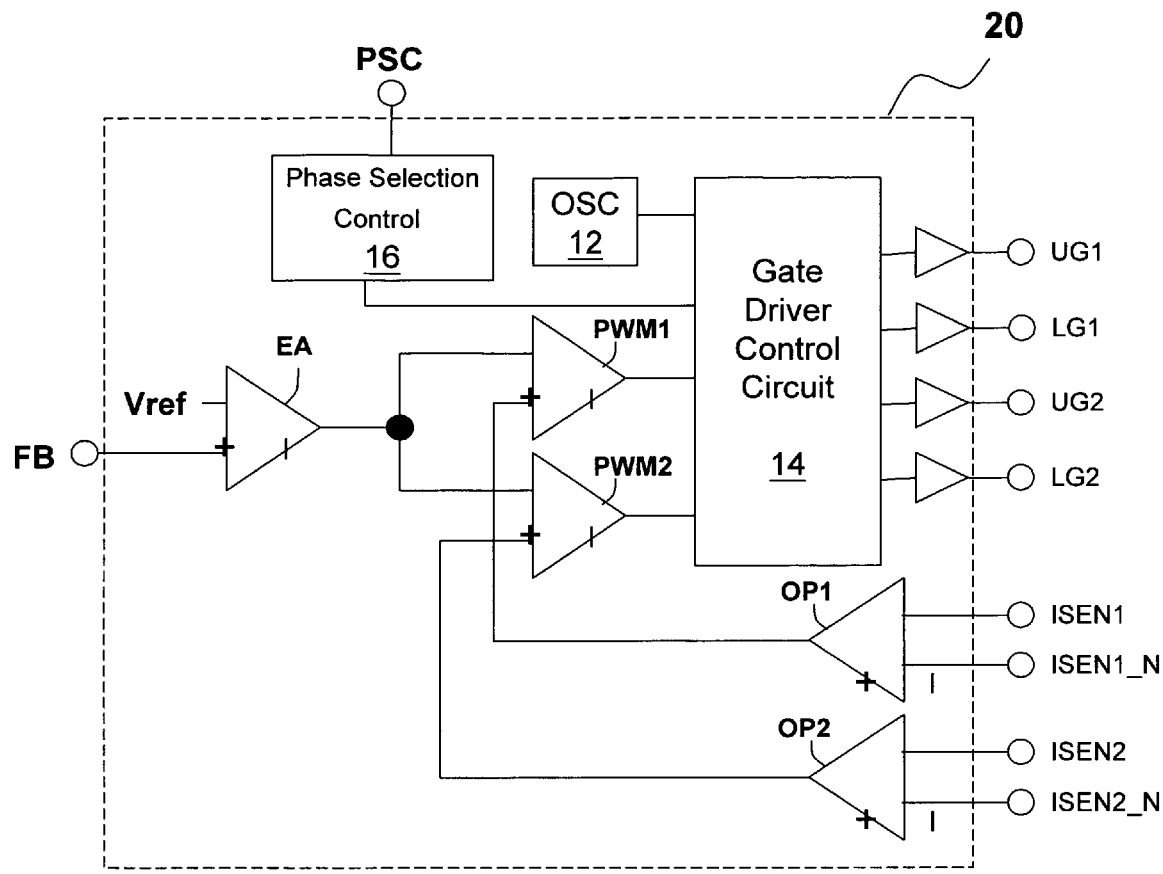
FIG. 3 shows an embodiment of a control circuit of the present invention.

Please refer to FIG. 3 which shows the first embodiment of the present invention. To simplify the drawing, the figure shows only a control circuit 20 of a power converter; the power switches, the inductor and the capacitor are omitted from the drawing. The control circuit 20 can be formed into an integrated circuit, to be used as the power management chip 10 in FIG. 2.

As shown in the figure, an error amplifier EA compares a feedback signal FB with a reference signal Vref to generate an error amplified signal, and the error amplified signal is inputted to PWM comparators PWM1 and PWM2 of different phases. Operational amplifiers OP1 and OP2 compare current signals ISEN1 and ISEN2 with output current signals ISEN1_N and ISEN2_N (referring also to FIG. 2) in respective phases, to generate corresponding differential current amplifier signals, and such differential current amplified signals are also inputted to corresponding PWM comparators PWM1 and PWM2. Additionally, a oscillation signal generated by an oscillation circuit (OSC) 12 and the outputs of the PWM comparators PWM1 and PWM2 are inputted to a gate driver control circuit 14. The gate driver control circuit 14 generates driver signals and drives corresponding power switches through multiple driver gates. In the foregoing circuit, the error amplified signal, the differential current amplified signal of each phase, and oscillation signal can be compared with one another in any sequence order; FIG. 3 is only one example. As another example, the differential current amplified signal and the oscillation signal can be added together first, and the sum is inputted to a negative input of the PWM comparator.

An external phase control signal PSC determines whether the circuit should enter a phase-shedding mode. The external signal PSC can be derived from a load circuit, such as a digital control signal issued by a micro-controller or a micro-processor in the load circuit, or an analog signal relating to a load current. A phase selection circuit 16 is provided, which can be designed in correspondence to the phase control signal PSC. When the phase selection circuit 16 receives the phase control signal PSC, it determines whether to enter the phase-shedding mode. Once the phase selection circuit 16 determines to enter the phase-shedding mode, it controls the gate driver control circuit 14 to disable one or more of the power conversion phases.

According to the present invention, when entering to the phase-shedding operation, the power conversion phases which are suspended are not always the same. Table 2 shows, with two-phase power converter as an example, the arrangement proposed by the present invention.

TABLE 2

| | Time period | | | | | |
|---|---|---|---|---|---|---|
| | T0 | T1 | T2 | T3 | T4 | T5 |
| Operational Phase number | 2 | 1 | 2 | 1 | 2 | 1 |
| Operational Phase | P1, P2 | P1 | P1, P2 | P2 | P1, P2 | P1 |
| Disabled Phase | | P2 | | P1 | | P2 |

As shown in Table 2, the circuit is in normal operation in time periods T0, T2 and T4, wherein all power conversion phases operate normally. The two-phase power converter enters the phase-shedding mode in time period T1, wherein it disables one of the power conversion phases, such as P2. Yet, at the next time (time period T3) when the circuit enters the phase-shedding mode, the two-phase power converter disables the other power conversion phase P1; the circuit alternates the disabled phase.

Figure 4:
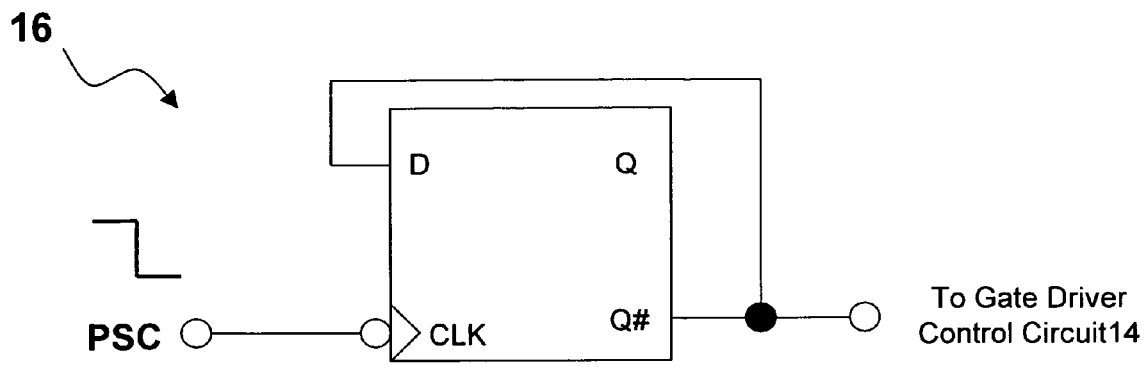

Based on the foregoing arrangement and assuming that the signal PSC is a digital signal whose falling edge (i.e., when the signal PSC changes from high level to low level) indicates that the circuit should enter the phase-shedding mode, the phase selection circuit 16 can be formed by a D flip-flop as shown in FIG. 4. In the embodiment of FIG. 4 a falling edge triggered D flip-flop is used. When the signal PSC changes from high level to low level, the D flip-flop switches its output level. Thus, the output of the D flip-flop can be used to determine the disabled phase in the phase-shedding mode.

Figure 5:
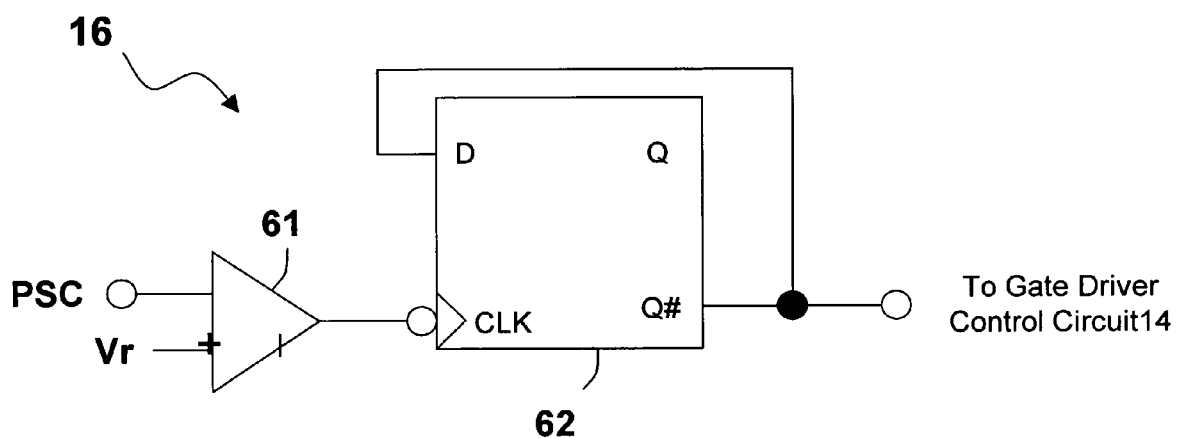

If the phase control signal PSC is an analog signal, as shown in FIG. 5, a comparator 61 can be provided to determine whether the PSC signal is lower than a predetermined threshold value Vr. If the PSC signal is lower than the predetermined value, indicating that the multi-phase power converter should enter the phase-shedding mode, the output of the comparator 61 switches from high level to low level, and the D flip-flop 62 can generate an output in the same manner as in FIG. 4 to determine the disabled phase in the phase-shedding mode.

Figure 6:
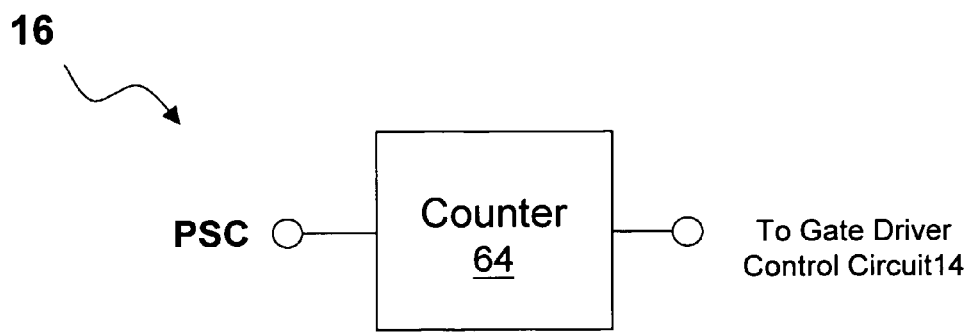

The foregoing description takes a two-phase power converter for example. If the multi-phase power converter has three phases or more than three phases, the D flip-flop can be replaced by a counter 64 as shown in FIG. 6 so as to shift the disabled phase in the phase-shedding mode.

In addition to the foregoing, the present invention can designate to disable or recover the operation of one or more power conversion phases by way of "flag setting" or "index setting". The "flag setting" (or "index setting") method is more effective when the multi-phase power converter has three or more phases, and more than one phase are to be disabled or recovered. Taking a five-phase power converter for example and referring to Table 3, the method is illustrated below.

TABLE 3

| | Time period | | | | | |
|---|---|---|---|---|---|---|
| | T0 | T1 | T2 | T3 | T4 | T5 |
| Operation requirement | All phases | Reduce 2 phases | Recover 1 phase | Reduce 3 phases | Recover 2 phases | Recover 1 phase |
| Phase P1 | ○ (tag ○) (tag X) | X (tag ○) | ○ | ○ (tag X) | ○ (tag X) | ○ (tag X) |

TABLE 3-continued

| | Time period | | | | | |
|---|---|---|---|---|---|---|
| | T0 | T1 | T2 | T3 | T4 | T5 |
| Phase P2 | O | X | X (tag O) | X (tag O) | O | O |
| Phase P3 | O | O (tag X) | O (tag X) | X | O | O |
| Phase P4 | O | O | O | X | X (tag O) | O |
| Phase P5 | O | O | O | X | X | X (tag O) |

In table 3, O indicates that the phase is in operation; X indicates that the phase is disabled; (tag X) is a flag indicating that a corresponding phase is next to be disabled or an index pointing to the phase that is next to be disabled, (tag O) is a flag pointing to the phase that is next to be recovered. As shown in Table 3, at time period T0; each phase operates normally. At time period T1, the five-phase power converter enters the phase-shedding mode which requires to reduce two phases; at this time point, according to the position where the flag or index (tag X) indicates or points to at the time period T0, the phases P1 and P2 are disabled, and the flag (tag X) is moved to the phase P3. At time point T2, one phase is required to be recovered; at this time point, according to the position where the flag (tax O) indicates or points to at the time period T1, the phase P1 is recovered, and the flag (tag O) is moved to the phase P2. At time period T3, three phases are required to be disabled; at this time point, according to the position where the flag (tag X) indicates or points to at the time period T2, the phases P3, P4, and P5 are disabled, and the flag (tag X) is moved to the phase P1. At time period T4, two phases are required to be recovered; at this time point, according to the position where the flag (tag O) indicates or points to at the time period T3, the phases P2 and P3 are recovered, and the flag (tag O) is moved to the phase P4. At the time period T5, one phase is required to be recovered; at this time point, according to the position where the flag (tag O) indicates or points to at the time period T4, the phase P4 is recovered, and the flag (tag O) is moved to the phase P5.

Figure 7:
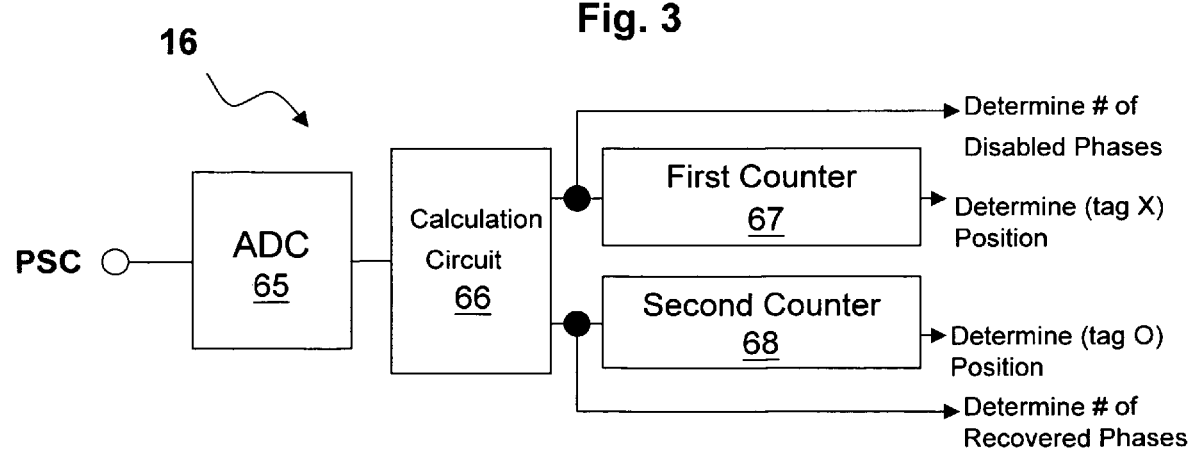
FIGS. 4-7 show four embodiments of phase selection circuits of the present invention.

The foregoing flag setting method can be embodied by a circuit such as the one shown in FIG. 7 (below FIG. 3). The PSC signal is an analog signal determining the number of operation phases by its level. An analog to digital converter (ADC) 65 converts the signal PSC to a digital signal. A calculation circuit 66 compares this digital value (target value) with the current number of operation phases (current value) to determine the number of phases to be disabled or recovered. According to the output of the calculation circuit 66, when the number of operating phases is to be reduced, the output of a first counter 67 determines the position of the flag (tag X). When the disabled phase or phases are to be recovered, the output of a second counter 68 determines the position of the flag (tag O).

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the phases do not have to be disabled or recovered sequentially; they can be disabled or recovered in any order. As another example, it is not necessary to change the disabled or recovered phase every time; the phase can repeat several times and then change (e.g., after the first power conversion phase is disabled twice, the second power conversion phase is disabled twice, and so on.) As yet another example, the recovering flag (tag O) in Table 3 does not have to indicate or point to any phase during the all-phase operation; it is only required in the phase-shedding mode. In view of the foregoing, the spirit of the present invention should cover all such and other modifications and variations, which should be interpreted to fall within the scope of the following claims and their equivalents.

What is claimed is:

1. A multi-phase power converter comprising:
   multiple power conversion phases; and
   a control circuit determining whether one or more of the multiple power conversion phases are in operation, wherein the control circuit does not always disable the same power conversion phase when the multi-phase power converter enters a phase-shedding mode.

2. The multi-phase power converter of claim 1, wherein the control circuit disables power conversion phases in turn when entering the phase-shedding mode.

3. The multi-phase power converter of claim 1, wherein the multi-phase power converter is a boost converter or a buck converter.

4. A method of controlling a multi-phase power converter, the multi-phase power converter including multiple power conversion phases, the method comprising:
   determining whether to enter a phase-shedding mode;
   at a first time when entering the phase-shedding mode, disabling at least one of the power conversion phases; and
   at another time when entering the phase-shedding mode, disabling at least another one of the multiple power conversion phases, but not disabling the at least one power conversion phase which is disabled at the first time.

5. The method of claim 4 further comprising:
   setting a disabling flag or index indicating or pointing to one of the power conversion phases; and
   when entering the phase-shedding mode, disabling one or more of the power conversion phases starting from the phase where the disabling flag or index indicates or points to, and setting the disabling flag or index to indicate or point to one of the power conversion phases which are not disabled.

6. The method of claim 5 further comprising:
   setting a recovering flag or index indicating or pointing to one of the disabled power conversion phases; and
   recovering one or more of the power conversion phases starting from the disabled phase where the recovering flag or index indicates or points to, and setting the recovering flag or index to indicate or point to one of the power conversion phases which are still disabled.

7. The method of claim 4 further comprising: receiving a phase control signal and determining whether to enter the phase-shedding mode in response to the signal.

8. The method of claim 7 further comprising: converting the phase control signal to a digital signal.

9. A control circuit of a multi-phase power converter, the multi-phase power converter including multiple power conversion phases, the control circuit comprising:
   a gate driver control circuit generating driver signals for driving the multiple power conversion phases to perform a power conversion operation, respectively; and
   a phase selection circuit coupled to the gate driver control circuit, the phase selection circuit determining whether to enter a phase-shedding mode according to a phase control signal; at a first time when entering the phase-shedding mode, the gate driver control circuit disabling at least one of the multiple power conversion phases; and at another time when entering the phase-shedding mode, the gate driver control circuit disabling at least another one of the multiple power conversion phases, but not disabling the at least one power conversion phase which is disabled at the first time.

10. The control circuit of claim 9, wherein the phase selection circuit includes a D flip-flop providing an output determining the disabled phase.

11. The control circuit of claim 10, wherein the phase control signal is an analog signal, and the phase selection circuit further includes a comparator whose comparison result controls the D flip-flop.

12. The control circuit of claim 9, wherein the phase selection circuit includes a counter providing an output determining the disabled phase.

13. The control circuit of claim 9, wherein the phase selection circuit includes:
    a calculation circuit comparing a target number with a current number of operational phases to determine the number of disabled or recovered phase or phases;
    a first counter coupled to the calculation circuit, an output of the first counter determining which phase is first to be disabled; and
    a second counter coupled to the calculation circuit, an output of the second counter determining which phase is first to be recovered.

14. The control circuit of claim 13, wherein the phase selection circuit further includes an analog to digital converter for converting the phase control signal to a digital signal.

* * * * *